United States Patent [19]
Schneider

[11] Patent Number: 5,909,445
[45] Date of Patent: Jun. 1, 1999

[54] MECHANISM FOR TRANSPORTING DIGITAL POTS SIGNALS WITHIN FRAMING STRUCTURE OF HIGH BIT RATE DIGITAL LOCAL SUBSCRIBER LOOP SIGNALS

[75] Inventor: Kevin W. Schneider, Huntsville, Ala.

[73] Assignee: Adtran, Inc., Huntsville, Ala.

[21] Appl. No.: 08/697,052

[22] Filed: Aug. 19, 1996

[51] Int. Cl.⁶ .................................. H04J 3/16; H04J 3/22
[52] U.S. Cl. ..................... 370/468; 370/476; 370/477; 370/538; 370/914; 370/485; 379/399
[58] Field of Search ................. 370/465, 466, 370/467, 468, 470–474, 476, 483–486, 493, 498, 503, 535, 537, 538, 542, 543, 914, 916, 458, 477, 522; 379/399, 29, 93.06

[56] References Cited

U.S. PATENT DOCUMENTS

| | | | |
|---|---|---|---|
| 5,111,497 | 5/1992 | Bliven et al. | 379/451 |
| 5,579,323 | 11/1996 | Krisher | 370/476 |
| 5,610,922 | 3/1997 | Balatoni | 370/468 |
| 5,771,236 | 6/1998 | Sansom et al. | 370/458 |
| 5,805,600 | 9/1998 | Venters et al. | 370/477 |

*Primary Examiner*—Douglas W. Olms
*Assistant Examiner*—Seema S. Rao
*Attorney, Agent, or Firm*—Charles E. Wands

[57] ABSTRACT

A local subscriber loop architecture embeds digitized POTS signals into the framing format of high bit rate digital subscriber loop signals being transported over a local loop for serving both subscriber digital terminal equipment and a POTS telephone. The remote transceiver unit is line-powered from the central office unit, facilitating installation of a reliable (office-powered) POTS interface (containing codec and subscriber line interface circuitry providing BORSHT functions) into the remote unit. The data rate of the added digital POTS signal is relatively small with respect to the data rate of the DSL channels, so that there is only slight increase in the overall data rate. As a consequence, adding the digital POTS signal has negligible impact on transport range. Moreover, the high-complexity analog filters used in an FDM architecture to separate the POTS signal from the DSL signal are not required

14 Claims, 6 Drawing Sheets

MECHANISM FOR TRANSPORTING DIGITAL POTS SIGNALS WITHIN FRAMING STRUCTURE OF HIGH BIT RATE DIGITAL LOCAL SUBSCRIBER LOOP SIGNALS

FIELD OF THE INVENTION

The present invention relates in general to telephone systems and networks, and is particularly directed to a new and improved local subscriber loop architecture that is operative to use the framing structure of high bit rate digital subscriber loop signals to transport data and digitally formatted, plain old telephone service, or 'digitized' POTS, between an analog telephone installed at a customer premises site and a digital network communication path to central office equipment.

BACKGROUND OF THE INVENTION

Traditional telephone service, commonly referred to as POTS (plain old telephone service), has been provided using analog signalling equipment. In an effort to meet the demand for high-bit-rate digital subscriber loop service (HDSL) that has accompanied the rapid growth of the digital computer industry, communication service providers currently use separately dedicated wire pairs, exclusive of those used for POTS service, for transporting digital signalling traffic at relatively high data rates (e.g, T1 signals at data rates of 1.544 Mb/s).

An example of such a high bit rate digital service network is diagrammatically illustrated in FIG. 1, wherein a 1.544 Mb/s signal (DS-1) 10 is coupled via a digital transceiver 12 to a local HDSL digital subscriber loop 14, which conveys the digital signals at the T1 data rate of 1.544 Mb/s, together with 16 kb/s of transport overhead to a network termination transceiver 16. From the network termination transceiver 16, respective digital signalling (DSL) channels are conveyed to customer premises digital terminal equipment. For the transmission of POTS signals, per se, FIG. 2 shows a conventional 64 kb/s PCM digital signalling link 20 interfaced via a CODEC 22 and SLIC 24 to a local analog loop 26, which serves a conventional analog telephone 28.

One proposal to integrate POTS service with high data rate digital service involves using frequency division multiplexing (FDM) of the digital data signals and analog POTS signals over the same wire-pair This technique, which is currently employed in asymmetric digital subscriber line (ADSL) systems and has been proposed for use in other DSL and HDSL systems, is shown diagrammatically in FIG. 3 as a combination of the digital only scheme of FIG. 1 with the POTS only scheme of FIG. 2.

Namely, at the office end of the local loop (which is typically powered from the central office), a 1.544 Mb/s digital signal (DS-1) 10 is interfaced via digital transceiver 12 to a first port 31 of an associated passband filter splitter/ combiner 30, a second port 32 of which is coupled to the local subscriber loop 14. Similarly, the CODEC 22 and SLIC 24, which interface the 64 kb/s PCM digital POTS signalling link 20, are coupled over an analog line 25 to a third port 33 of filter splitter/combiner 30, so that, in the office-to-customer premises direction, as an example, the splitter/combiner 30 couples frequency division multiplexed HDSL signals and analog POTS signals over the same loop 14 to the customer site.

In a complementary fashion, the remote customer premises end of the local loop 14 is terminated at a first port 41 of a passband filter splitter/combiner 40 having a second port 42 coupled to HDSL transceiver 16, which interfaces respective DS-1 signals with locally powered customer premises digital terminal equipment 45. For the analog POTS signals, passband filter splitter/combiner 40 has a third port 43 coupled via local analog loop 26 to a conventional analog telephone 28.

A significant shortcoming of the FDM approach shown in FIG. 3 is the fact that, in order to obtain adequate filtering, the presence of the POTS signal removes 20–30 KHz of low frequency bandwidth that would otherwise be available for use by the digital (DSL) system, thereby reducing the effective range.

SUMMARY OF THE INVENTION

In accordance with the present invention, the shortcomings of the frequency division multiplexing approach, described above, are effectively obviated by a new and improved local subscriber loop architecture for embedding digitized POTS signals into the framing format of DSL signals (e.g., high bit. rate digital subscriber loop signals) being transported over a local subscriber loop for serving both subscriber digital terminal equipment and a POTS telephone.

Pursuant to a non-limiting example of this modified framing format POTS-integrated local subscriber loop architecture, at the office end of the local loop, a high bit rate digital 1.544 Mb/s signal is interfaced with a DS-1 line interface unit and framer within a central office-associated HDSL transceiver unit (HTU-C).

Within a respective HTU-C, a conventional foreign exchange office (FXO) interface of the type commonly used in channel banks or universal digital loop carrier systems is coupled with an analog POTS line from central office-based equipment, such as a 64 kb/s PCM codec and associated SLIC. The DS-1 line interface unit and framer, and the FXO interface are coupled with one or more internal HDSL transceivers, coupled to the office end of a local loop (or loops). An HDSL framing format employed by the HDSL framer is augmented to accept an additional POTS PCM payload In particular, the clock rate for a conventional HDSL framing structure is modified to provide for the insertion of an eight bit (8 kb/s sampled) PCM POTS signal. The HDSL baud rate is also slightly increased to accommodate the higher framer clock rate. While it would also be possible to usurp one of the DS0 payload time slots in the HDSL DS-1 payload signal, the slightly enlarged HDSL framing format and baud rate enables an HDSL frame to transport both the entire DS-1 payload and the 64 kb/s PCM POTS data without a significant range decrease penalty. An HDSL frame contains forty-eight payload blocks B01–B48, each containing a single DS-1 frame of twenty-four DS0 time slots or channels. Where the 64 kb/s PCM channel is shared between two loops, in each payload block Bi, the first twelve DS0 time slots DS0-1 . . . DS0-12 are transmitted on one loop and the remaining twelve DS0 time slots DS0-13 . . . DS0-24 are transmitted on the other loop, for a total of twenty-four DS0 channels.

In accordance with the present invention, four bits of the PCM POTS data are added to each of the payload blocks on each loop, thereby totalling eight bits of PCM data per payload block, which is equivalent to an aggregate data rate of 64 kb/s. For a single loop HDSL system, an HDSL frame contains 48 payload blocks B01–B48, each containing a single DS-1 frame of twenty-four DS0 time slots or channels. In the single loop case, however, each payload block carries all twenty-four DS0 channels of the DS-1 frame and the all eight bits of PCM POTS data.

The FXO interface couples an incoming loop open/close bit from the HDSL framer and an outgoing ring indication bit to the HDSL framer. These bits are transported between the HTU-C and a remote (customer premises site-associated) HDSL transceiver unit (HTU-R), by using previously unspecified indicator bits in the HDSL overhead. The ring indication bit may be used to indicate that a ringing voltage is present on the line. Another bit may be provided to indicate the line has been disconnected. The FXO interface receives the loop open/close bit from the HDSL framer to indicate whether the loop is closed or open.

As described above, the remote end of the local loop is coupled to an HTU-R. The HTU-R includes a conventional foreign exchange station (FXS) interface that provides service for a customer premises analog phone. The HTU-R also includes an internal DS-1 line interface unit and framer that is connected to a DS-1 terminal device of the customer premises equipment. An HDSL framer couples the FXS interface and the DS-1 line interface unit and framer to one or more HDSL transceivers coupled to the remote end of the local loop. The FXS interface couples the outgoing bit to the HDSL framer and receives the incoming bit from the HDSL framer.

DETAILED DESCRIPTION

Figure 1:
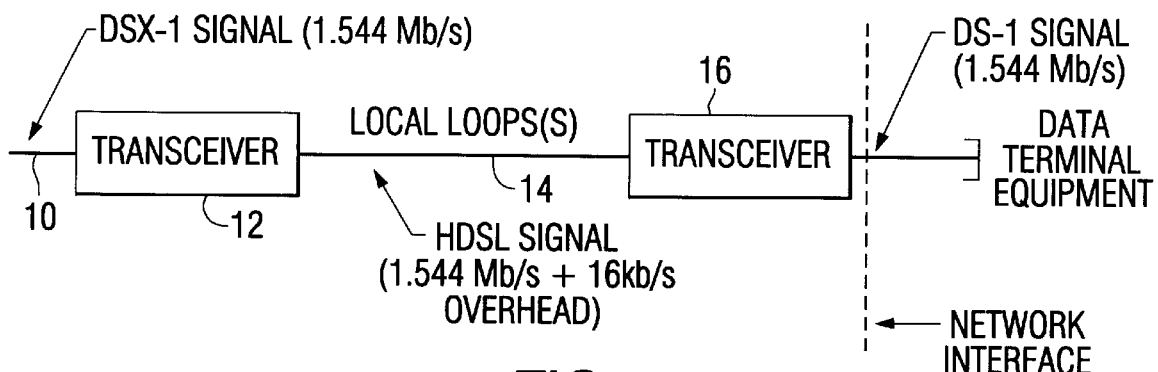
FIG. 1 diagrammatically illustrates an example of a digital equipment architecture for the transport of high bit rate digital service over a local loop to customer premises digital terminal equipment.
Figure 2:
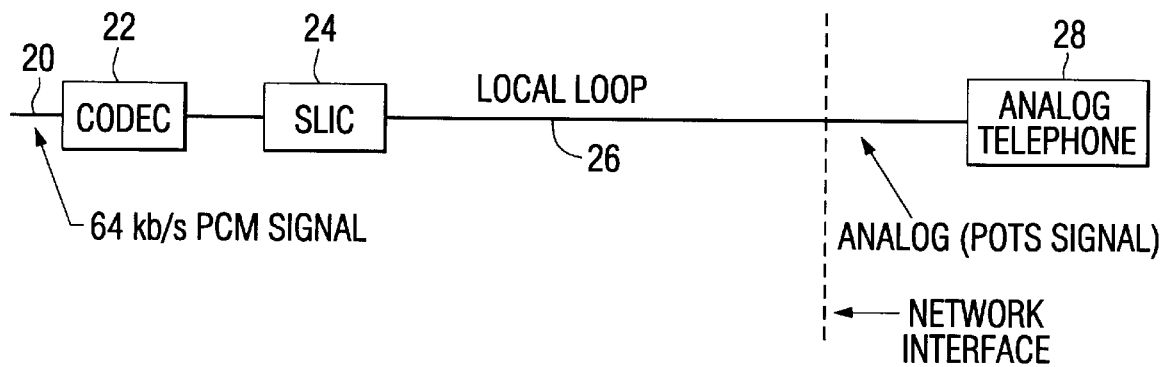
FIG. 2 diagrammatically illustrates a conventional 64 kb/s PCM digital signalling link interfaced via a CODEC and a SLIC to a local analog loop serving a conventional analog telephone.

Before describing in detail the new and improved local subscriber loop architecture of the present invention for embedding digitized POTS signals in the framing format of DSL signals being transported over a local loop for serving both subscriber digital terminal equipment and a POTS telephone, it should be observed that the invention resides primarily in what is effectively a prescribed arrangement of conventional communication circuits and associated digital signal processing components and attendant supervisory control circuitry therefor, that controls the operations of such circuits and components.

Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 4:
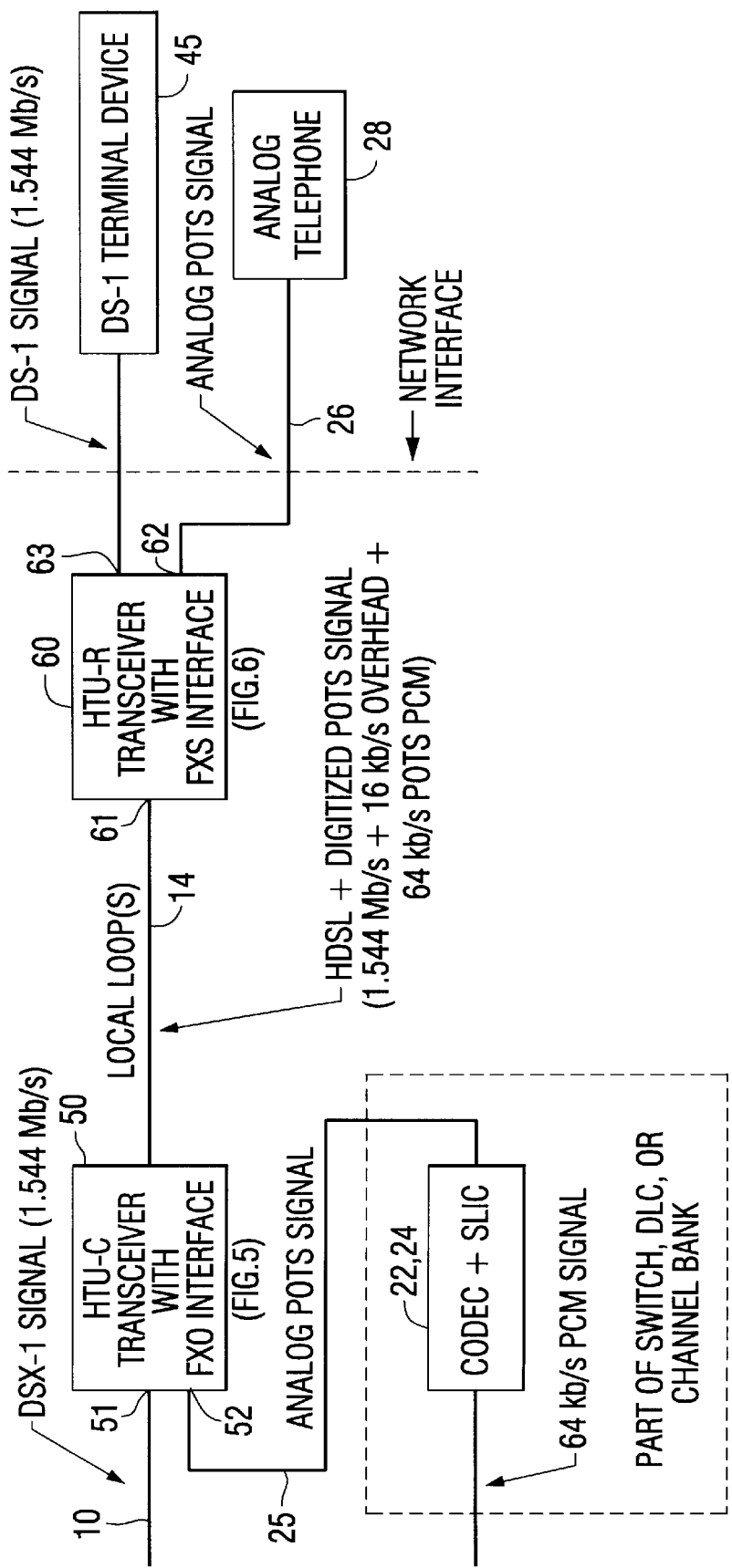
FIG. 4 diagrammatically illustrates a non-limiting example of a local subscriber loop architectures that is configured in accordance with the principles of the present invention to transport digitized POTS signals within the framing format of DSL signals over a local subscriber loop.

FIG. 4 diagrammatically illustrates a non-limiting example of a digital local subscriber loop architecture, that is configured in accordance with the principles of the present invention, to transport digitized POTS signals within the framing format of DSL signals over a local subscriber loop. As shown therein, at the central office end of the local loop, high bit rate 1544 Mb/s signals (DS-1) 10 are coupled to a first port 51 of a central office-associated HDSL transceiver unit (HTU-C) 50, and is interfaced with a DS-1 line interface unit (LIU) and framer within the HTU-C 50. The architecture of HTU-C 50 and the manner in which its DSL framing structure is modified in accordance with the present invention to accommodate digitized POTS signals within the framing structure of the (H)DSL signalling traffic will be described in detail below with reference to FIGS. 5, 7 and 8.

HTU-C 50 has a second port 52 which is coupled to the analog POTS line 25 from central office-based equipment, such as a 64 kb/s PCM codec 22 and associated SLIC 24 resident in an office switch bank, for example, by way of a conventional foreign exchange office (FXO) interface of the type commonly used in (D4) channel banks or universal digital loop carrier systems A third port 53 of HTU-C 50, which is connected via port 53 to an internal (H)DSL transceiver, is coupled to a local loop (or loops) 14.

The remote end of the loop(s) 14 is terminated at a first port 61 of a remote (customer premises site-associated) HDSL transceiver unit (HTU-R) 60 (the architecture of which will be described in detail below with reference to FIG. 6), and is coupled to a DSL transceiver within HTU-R 60. HTU-R 60 includes a conventional foreign exchange station (FXS) interface, which provides battery (B) feed, overvoltage (O) protection, ringing (R), signalling (S), coding (C), hybrid (H) and test (T), or "BORSHT", functionality for customer premises analog phones. This FXS interface within HTU-R 60 is coupled to a second port 62 which is coupled over analog POTS line 26 to analog telephone 28. HTU-R 60 has a third port 62 by way of which the 1.544 Mb/s digital signals (DS-1) are interfaced via an internal DS-1 line interface unit and framer to DS-1 terminal device 45 of the customer premises equipment.

Figure 5:
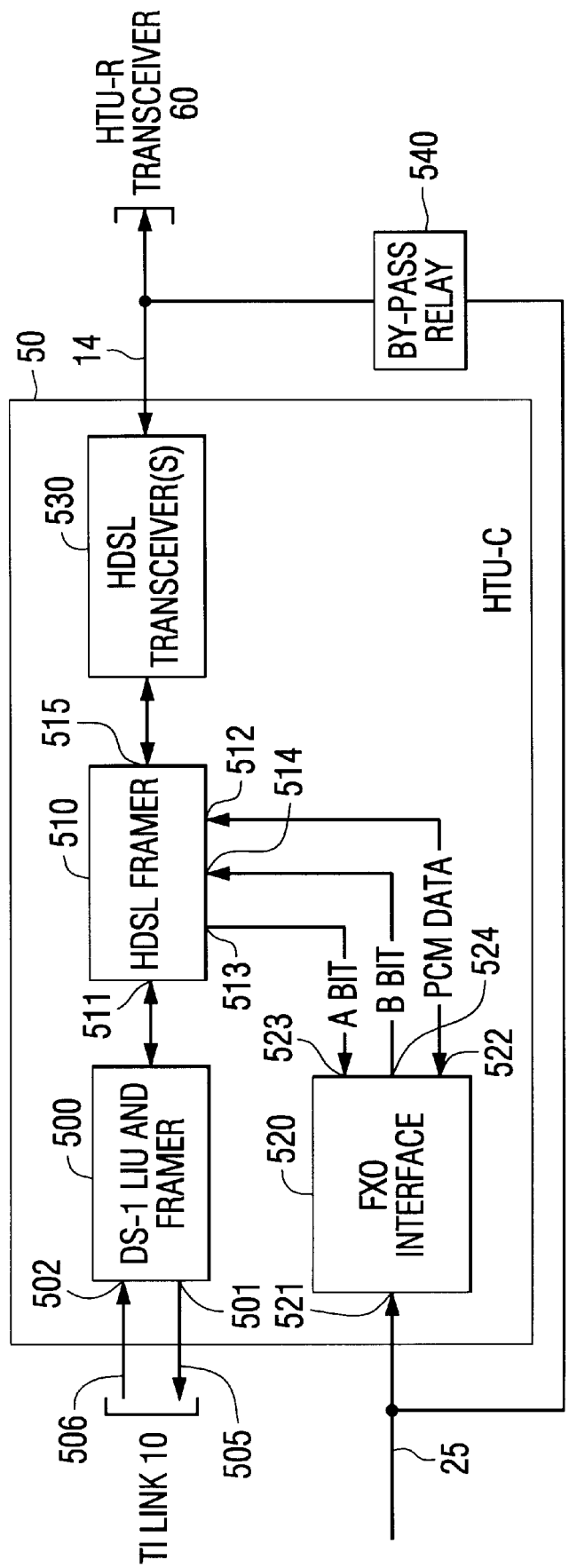
FIG. 5 diagrammatically illustrates the composition of a central office-associated HDSL transceiver unit (HTU-C) in the local subscriber loop architecture of FIG. 4.

The architecture of the HTU-C 50 is diagrammatically illustrated in FIG. 5 as comprising a standard DS-1 line interface unit (LIU) and framer 500, having respective transmit and receive terminals 501 and 502 that are ported to respective office lines 505 and 506, to which the 1.544 Mb/s digital signals (DS-1) 10 are coupled. DS-1 LIU and framer 500 is coupled to a first digital port 511 of an HDSL framer 510, the framing format of which is defined in the manner shown in one of FIGS. 7 and 8, to be described.

HTU-C 50 further includes an FXO interface 520 having a first port 521, which is coupled to the analog POTS line 25 from central office-based equipment. FXO interface 520 has a second port 522 which couples 8-bit PCM POTS data, sampled at 8 khz, with respect to a second port 512 of HDSL framer 510. As pointed out above, and as will be described with reference to FIGS. 7 and 8, the normal HDSL-only framing format employed by the HDSL framer 510 is modified to accept the additional POTS PCM payload. FXO interface 520 includes a third port 523 which couples an incoming signalling (A) bit from a third port 513 of framer 510, while a fourth port 524 couples an outgoing signalling (B) bit to a fourth port 514 of HDSL framer 510. These signaling bits are associated with conventional FXO and FXS notation, as described, for example, in the text: "Subscriber Loop Signaling and Transmission Handbook: Digital," by Whitham D. Reeve, IEEE Press, 1995.

The signalling bits are transported between the HTU-C 50 and HTU-R 60, respectively by using previously unspecified indicator bits in the HDSL overhead The FXO interface 520 provides the B-bit, which indicates that a ringing voltage is present on the line (e.g., B=1).

The FXO interface 520 receives the A-bit from the FXS interface of the HTU-R via the HDSL framer 510 as an input to indicate whether the analog loop to the customer 26 is closed (e.g., A=1) or open (e.g., A=0) HDSL framer 510 has a fifth port 515 coupled to one or more HDSL transceivers 530, which interface the modified HDSL data frames with the local loop 14.

Figure 6:
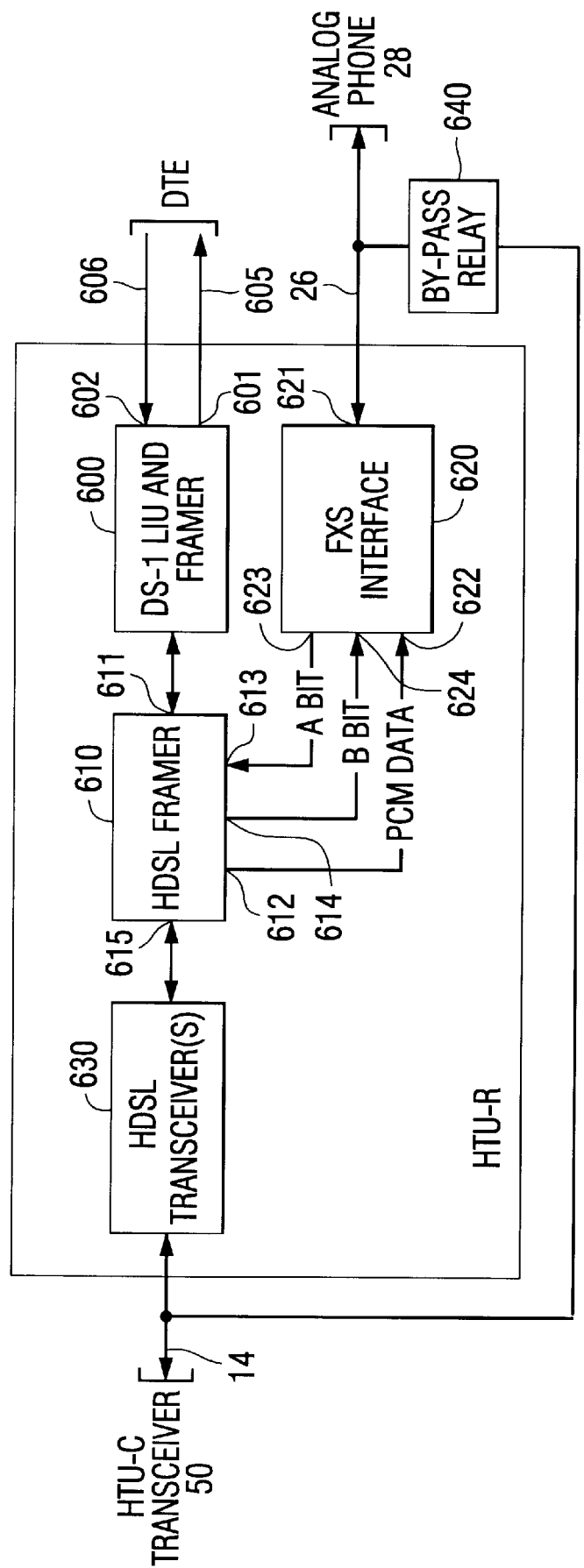
FIG. 6 diagrammatically illustrates the composition of a remote site-associated HDSL transceiver unit (HTU-R) in the local subscriber loop architecture of FIG. 4.

FIG. 6 shows the architecture of the HTU-R 60, which is complementary to that of the HTU-C 50 of FIG. 5. The HTU-R 60 comprises a DS-1 line interface unit (LIU) and framer 600, having respective transmit and receive terminals 601 and 602 ported to respective transmit and receive lines 605 and 606, for conveying 1.544 Mb/s digital signal (DS-1) signals with respect to customer premises digital terminal equipment. DS-1 LIU and framer 600 is also coupled to a first digital port 611 of an HDSL framer 610.

HTU-R 60 further includes an FXS interface 620 having a first port 621, which is coupled to the analog POTS line 26 serving a customer's analog telephone 28. FXS interface 620 has a second port 622 which couples the 8-bit PCM POTS data, sampled at 8 khz, with respect to a second port 612 of HDSL framer 610. FXS interface 620 includes a third port 623, which couples the outgoing A bit to a third port 613 of framer 610, while a fourth port 624 couples the incoming B bit from a fourth port 614 of HDSL framer 610. The HDSL framer 610 has a fifth port 615 coupled to one or more HDSL transceivers 630, which interface the modified HDSL data frames with the local loop 14.

Figure 7:
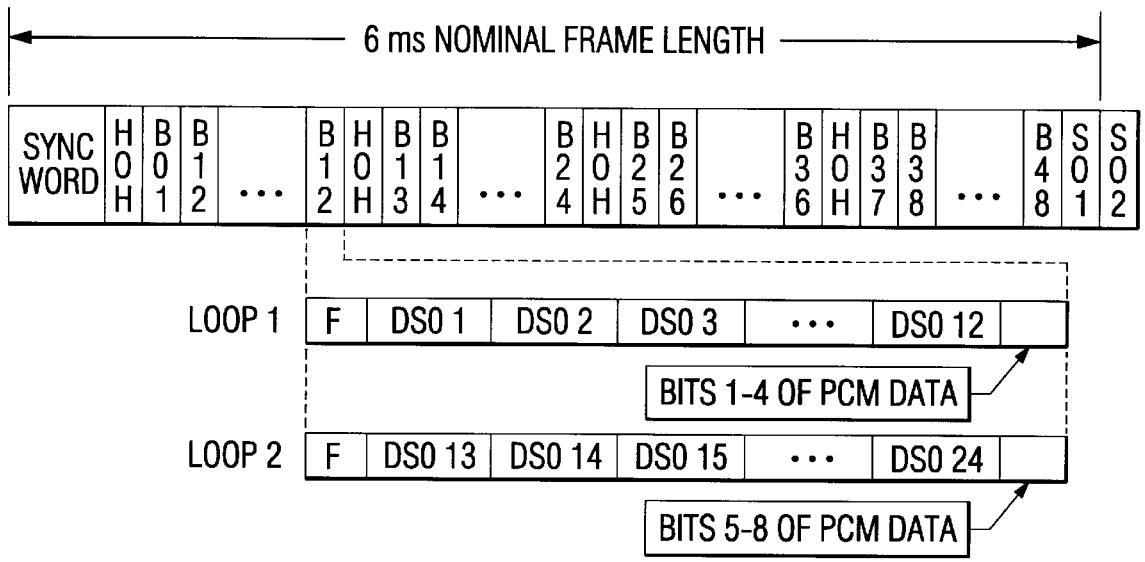
FIG. 7 shows the modified HDSL framing format of a two-loop HDSL framing structure for incorporating 8-bit PCM POTS data.
Figure 8:
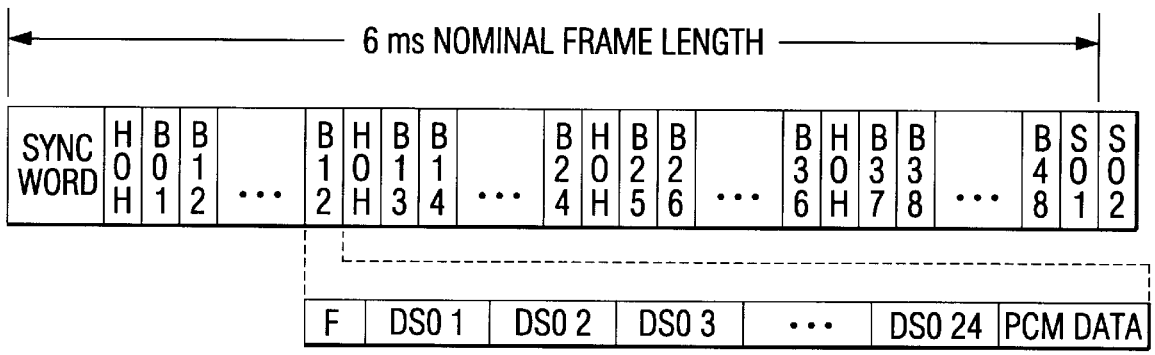
FIG. 8 shows the modified HDSL framing format of a single HDSL framing structure for incorporating 8-bit PCM POTS data.

FIGS. 7 and 8 diagrammatically illustrate alternative embodiments employed by the present invention for modifying the conventional HDSL framing structure employed by each of the HDSL framer 510 within the HTU-C 50 and the HDSL framer 610 within the HTU-R 60 to include the 8-bit (8 kb/s sampled) PCM POTS signal. While it would also be possible to usurp one of the DS0 payload time slots in the HDSL DS-1 payload signal, the modified HDSL framing formats of FIGS. 7 and 8 serves to augment the HDSL frame to transport both the entire DS-1 payload and the 64 kb/s PCM POTS data.

In the framing format diagram of FIG. 7, an example of a two-loop HDSL framing structure is shown, where the 64 kb/s PCM channel is shared between the loops in a two-loop HDSL circuit. In the illustrated framing structure, an HDSL frame contains 48 payload blocks B01–B48, each containing a single DS-1 frame of twenty-four DS0 payload time slots or channels. In each payload block Bi, the first twelve DS0 payload time slots DS0-1 . . . DS0-12 are transmitted on one loop and the remaining twelve DS0 payload time slots DS0-13 . . . DS0-24 are transmitted on the other loop, for a total of 24 DS0 channels.

As described previously, in accordance with the present invention, the clock rate for a conventional HDSL framing structure is increased slightly to provide for the insertion of an eight bit (8 kb/s sampled) PCM POTS signal. The HDSL baud rate is also increased in proportion to the amount of increase in the framer clock rate. Rather than expropriate one of the DS0 payload time slots in the HDSL DS-1 payload signal, the slightly enlarged HDSL framing format and baud rate enables an HDSL frame to transport both the entire DS-1 payload and the 64 kb/s PCM POTS data without a significant range reduction penalty. In the present invention, increasing the clock rate allows four bits of the PCM POTS data to be added to each of the payload blocks on each loop, thereby totalling eight bits of PCM data per payload block, which is equivalent to an aggregate data rate of 64 kb/s. As a non-limiting example, for a dual loop HDSL system (having the framing format of FIG. 7), having a bit rate of 784 kb/s per loop, increasing the data rate by 32 kb/s results in an increased clock rate of 816 kb/s, or an increase on the order of 4.1%.

The framing format diagram of FIG. 8 for a single loop HDSL system is similar to that of FIG. 7, in that an HDSL frame contains 48 payload blocks B01–B48, each containing a single DS-1 frame of twenty-four DS0 time slots or channels. In the single loop case, however, the framing clock rate is such that each payload block carries all twenty-four DS0 channels of the DS-1 frame and all eight bits of PCM POTS data. For a single loop HDSL system having the framing format of Figure, having a bit rate of 1552 kb/s per loop, as a non-limiting example, increasing the data rate by 64 kb/s results in an increased clock rate of 1616 kb/s, (an increase on the order of 4.1%).

Figure 3:
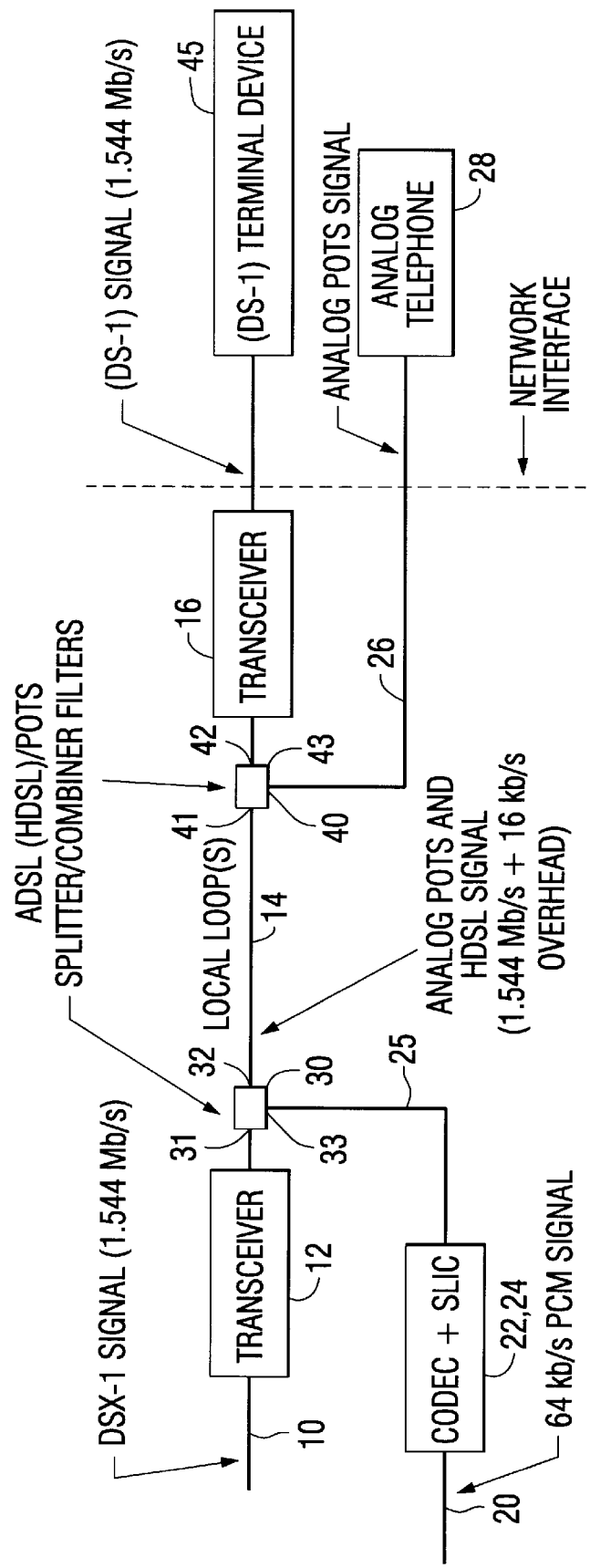
FIG. 3 diagrammatically illustrates a proposed FDM architecture for integrating POTS service with high data rate digital service over the same wire-pair.

From the foregoing description, it will be readily appreciated that the modified subscriber loop architecture of the present invention provides an alternative technique for transporting POTS service over a local subscriber loop, by digitizing the POTS signal at the central office transceiver (HTU-C) and embedding the digitized POTS data as part of an HDSL payload. Having the remote transceiver unit (HTU-R) line-powered from the central office unit not only allows a central office-powered POTS interface (containing codec and subscriber line interface circuitry providing BORSHT functions) to be readily built into the remote unit, but ensures that remotely provided POTS is always available Advantages of this new approach also include the fact that the data rate of the added digital POTS signal is relatively small with respect to the data rate of the DSL channels, so that there is only slight increase in the overall data rate (on the order of less than five percent). Thus, adding the digital POTS signal has negligible impact on transport range. Moreover, the high-complexity analog filters used in the FDM approach of FIG. 3 to separate the POTS signal from the DSL signal are not required.

To further increase the reliability of the POTS service, POTS backup relays can be added to both of the transceivers at opposite ends of the loop, as diagrammatically shown at 540 and 640, respectively, in FIGS. 5 and 6. For this purpose, the POTS back-up relay architecture described in co-pending application Ser. No. 08/500,189, filed Jul. 10, 1995, by Michael S. Sansom et al, entitled: "Mechanism for Providing Emergency POTS Service in Event of Loss of Power to Customer Premises Equipment for ISDN Telephone Lines," now pending, assigned to the assignee of the present application and the disclosure of which is incorporated herein, may be used.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of transporting plain old telephone service (POTS) signals over a communication link between a central office and an analog telephone at a customer premises comprising the steps of:
   (a) digitizing analog POTS signals into digitally formatted POTS signals of a digital POTS payload channel having a digital POTS data rate;
   (b) providing high bit rate digital subscriber loop (HDSL) signals for transport over said communication link, said HDSL signals having an HDSL framing structure that is clocked at a first clock rate and contains a plurality of HDSL payload blocks, each HDSL payload block containing a plurality of digital subscriber loop (DSL) payload time slots;
   (c) increasing said first clock rate of said HDSL framing structure of said HDSL signals, by a prescribed fraction of said first clock rate corresponding to the ratio of said digital POTS data rate to said first clock rate, to a second HDSL framing structure clock rate that accommodates said digital POTS payload channel having said digital POTS data rate within said HDSL framing structure, without usurping contents of any of said plurality of DSL payload time slots;
   (d) incorporating a prescribed number of bits of said digital POTS payload channel within each HDSL payload block of said plurality of HDSL payload blocks of said HDSL framing structure having said second HDSL framing structure clock rate, so as to produce a modified HDSL framing structure having said second HDSL framing structure clock rate and containing each said plurality of DSL payload time slots and said digital POTS payload channel; and
   (e) transporting said modified HDSL framing structure containing each said plurality of DSL payload time slots and said digital POTS payload channel at said second HDSL framing structure clock rate over said communication link between a central office-associated digital transceiver serving said central office and a remote transceiver coupled to said an analog telephone at said customer premises.

2. A method according to claim 1, wherein said communication link comprises a multiple loop communication circuit, and wherein a first portion of said digital POTS payload channel is incorporated in a modified HDSL framing structure of a first loop of said multiple loop communication circuit, and wherein a second portion of said digital POTS payload channel is incorporated in a modified HDSL framing structure of a second loop of said multiple loop communication circuit.

3. A method according to claim 1, wherein said communication link comprises a single loop communication circuit.

4. A method according to claim 1, wherein said HDSL framing structure contains forty-eight HDSL payload blocks, each HDSL payload block containing twenty-four time slots.

5. A method according to claim 4, wherein said digital POTS data rate is 64 kb/s of digitized POTS data, and wherein eight bits of said digital POTS payload channel are incorporated within each HDSL payload block.

6. A communication system for transporting plain old telephone service (POTS) signals over a communication link from a first site to a second site comprising:
   an HDSL framer at said first site, and being coupled to receive digitally formatted POTS signals of a digital POTS payload channel having a digital POTS data rate, and high bit rate digital subscriber loop (HDSL) signals for transport over said communication link, said HDSL signals having an HDSL framing structure that is clocked at a first clock rate and contains a plurality of HDSL payload blocks, each HDSL payload block containing a plurality of digital subscriber loop (DSL) payload time slots, and wherein said HDSL framer is operative to increase said first clock rate of said HDSL framing structure of said HDSL signals, by a prescribed fraction of said first clock rate corresponding to the ratio of said digital POTS data rate to said first clock rate, to a second HDSL framing structure clock rate that accommodates said digital POTS payload channel having said digital POTS data rate within said HDSL framing structure, without usurping contents of any of said plurality of DSL payload time slots, and to incorporate a prescribed number of bits of said digital POTS payload channel within each HDSL payload block of said plurality of HDSL payload blocks of said HDSL framing structure having said second HDSL framing structure clock rate, so as to produce a modified HDSL framing structure having said second HDSL framing structure clock rate and containing each said plurality of DSL payload time slots and said digital POTS payload channel; and
   a first transceiver coupled to said HDSL framer and being operative to transport said modified HDSL framing structure containing each said plurality of DSL payload time slots and said digital POTS payload channel at said second HDSL framing structure clock rate over said communication link to a second transceiver at said second site of said communication link.

7. A communication system according to claim 6, further including a deframer coupled to said second transceiver at said second site and being coupled to extract said digital POTS payload channel from said modified HDSL framing structure for delivery by way of a digital to analog POTS interface to an analog telephone at a customer premises.

8. A communication system according to claim 6, wherein said digital to analog POTS interface comprises a foreign exchange station (FXS) interface coupled to said customer premises analog telephone.

9. A communication system according to claim 6, wherein said communication link comprises a multiple loop communication circuit, and wherein a first portion of said digital POTS payload channel is incorporated in a modified HDSL framing structure of a first loop of said multiple loop communication circuit, and wherein a second portion of said digital POTS payload channel is incorporated in a modified HDSL framing structure of a second loop of said multiple loop communication circuit.

10. A communication system according to claim 6, wherein said communication link comprises a single loop communication circuit.

11. A communication system according to claim 6, wherein said HDSL framing structure contains forty-eight HDSL payload blocks, each HDSL payload block containing twenty-four time slots.

12. A communication system according to claim 11, wherein said digital POTS data rate is 64 kb/s of digitized POTS data, and wherein eight bits of said digital POTS payload channel are incorporated within each HDSL payload block.

13. A communication system according to claim 6, wherein said second transceiver at said second site is remotely powered by way of said communication link from said first site.

14. A communication system according to claim 6, further comprising one or more POTS back-up relays installed at one or more of said first and second sites, and being operative to controllably provide a back-up POTS communication path between said communication link and POTS telephone signals coupled to said first and second sites.

* * * * *